(12) United States Patent
Wang

(10) Patent No.: US 11,828,933 B1
(45) Date of Patent: Nov. 28, 2023

(54) AIR-BLOWING TYPE LENS PROTECTION DEVICE

(71) Applicant: Hunan Guangmo Technology Co., Ltd., Hunan (CN)

(72) Inventor: Huan Wang, Hunan (CN)

(73) Assignee: HUNAN GUANGMO TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 18/133,887

(22) Filed: Apr. 12, 2023

(30) Foreign Application Priority Data

Sep. 22, 2022 (CN) .......................... 202222509652.0

(51) Int. Cl.
G02B 1/00 (2006.01)
G02B 27/00 (2006.01)
G03B 17/56 (2021.01)

(52) U.S. Cl.
CPC ......... *G02B 27/0006* (2013.01); *G03B 17/56* (2013.01)

(58) Field of Classification Search
CPC ...... G02B 27/0006; G03B 17/56; B08B 5/02; B08B 13/00; B08B 2205/005
See application file for complete search history.

(56) References Cited

U.S. PATENT DOCUMENTS

2010/0024887 A1* 2/2010 Williams .................. F15D 1/00
454/189
2021/0215930 A1* 7/2021 Subratie ............. G02B 27/0006

\* cited by examiner

*Primary Examiner* — Euncha P Cherry
(74) *Attorney, Agent, or Firm* — Muncy, Geissler, Olds & Lowe, P.C.

(57) ABSTRACT

The air-blowing type lens protection device relates to the technical field of cameras, to solve the technical problems of unclear images with the use of cameras or camcorders in extreme environments in the prior art. The invention comprises a blowing assembly provided on the camera, and the air-blowing port of the blowing assembly is aimed at the lens on camera.

9 Claims, 9 Drawing Sheets

AIR-BLOWING TYPE LENS PROTECTION DEVICE

1. TECHNICAL FIELD

The invention relates to the field of camera technology, in particular to an air-blowing type lens protection device.

2. BACKGROUND ART

The current majority of photography, camera imaging is basically dependent on optical lens imaging, resulting in the impact of the lens in extreme environments such as rain, fog, snow, sand and dust on the lens image quality greatly. Because the rain, snow, sand and dust particles floating in the air will adhere to the front of the lens thus affecting the optical imaging, the picture clarity is reduced.

The existing technology has the following technical problem:

in the prior art, the use of cameras or camcorders in extreme environments, will lead to the problem of unclear picture.

3. SUMMARY OF THE INVENTION

The purpose of the invention is to provide an air-blowing type lens protection device to solve the technical problems of the prior art of the problem of unclear images when using the camera or the video camera in extreme environments. The preferred technical solution of the numerous technical solutions provided by the invention can produce many technical effects are explained in detail hereinafter.

To achieve the above purpose, the invention provides the following technical solutions:

The invention provides an air-blowing type lens protection device, comprising a blowing assembly, wherein the blowing assembly is provided on the camera, and the air-blowing port of the blowing assembly is aimed at the lens on the camera.

Optionally, the air-blowing type lens protection device further comprises a lens mount, a wind deflector bracket and a lens; the wind deflector bracket and the blowing assembly are provided on the same side of the lens mount, and the blowing assembly is provided on top of the wind deflector bracket; the wind deflector bracket and the blowing assembly are connected to the lens mount; the middle of the lens mount is connected to the lens in bayonet mount, the lens is mounted in the wind deflector bracket, and the air-blowing port of the blowing assembly is aimed at the wind deflector bracket.

Optionally, the blowing assembly comprises a motor, a blowing device, a control element and a housing; the motor and the control element are provided in the housing, and the blowing device is provided at the air inlets of the housing; the motor and the control element are electrically connected, and the output shaft of the motor is connected to the blowing device; the housing is connected to the lens mount, the side wall of the housing is provided with the air-blowing port.

Optionally, the blowing assembly further comprises protective covers and a conical duct; the protective covers are connected to the outer wall of the air inlets of the housing, and the conical duct is provided in the housing; the blowing device and the control element are provided on each side of the conical duct.

The protective covers are provided with a plurality of baffles.

The air-blowing port are provided with a plurality of teeth.

Optionally, the housing is provided with a control button and a power connector, and both the control button and the power connector are electrically connected to the control element.

Optionally, the wind deflector bracket comprises connecting side plates, wind deflectors, a rain deflector and a diffuser plate; there are two connecting side plates and two wind deflectors; the lens mount is connected to the connecting side plate, and the lens mount and the connecting side plate are clamped to the lens; the connecting side plates and the wind deflectors are fixedly connected, the rain deflector is connected to the blowing assembly, and each end of the diffuser plate is connected to the ends of two the connecting side plates.

Optionally, the rain deflector is provided in an inclined position.

Optionally, a plurality of toothed recessed grooves are provided on one end face of the diffuser plate, and a connection piece is provided on the other end face of the diffuser plate.

Optionally, the lens mount comprises a frame plate, thickening strips, connecting plate, clamp, adjusting screw rod and supporting bracket; the upper end of the frame plate is connected to the blowing assembly, and the side end of the wind deflector bracket, the side end of the frame plate, the thickening strips and the connecting plate are connected in sequence; the number of the thickening strips is two, and there is a space between the frame plate and the connecting plate, with the space provided for placing filters.

The connecting plate is provided with a penetration opening in the middle, and the clamp is connected to the end of the penetration opening; the supporting bracket is connected to the connecting plate, the adjusting screw rod passes through the supporting bracket and is connected to the two free ends of the clamp, and the lens is clamped to the clamp.

Optionally, the invention further comprises a connection bracket; the connecting bracket is provided in bolted connection with the wind deflector bracket, and the connecting bracket is capable of clamping connection with the support frame on the camera.

The connecting bracket comprises a clamping bracket, a third connecting piece, an adjusting mechanism and a locking mechanism; the clamping bracket is provided with hook type structure at both ends, and the end of the clamping bracket can be connected to the guide rail column on the support frame; the end of the clamping bracket is rotatably connected to the locking mechanism and the locking mechanism can fasten to the guide rail column; the third connecting piece is bolted to the wind deflector bracket, the end of the adjusting mechanism is connected to the third connecting piece and the adjusting mechanism is movably connected to the middle of the clamping bracket.

The invention provides an air-blowing type lens protection device, which is provided when using a camera or camcorder in an extreme environment by first mounting the blowing assembly on the camera or camcorder. The air-blowing port of the blowing assembly will be aimed at the lens on the camera or camcorder at this time, and then the blowing assembly will be activated to produce high-speed gas. The high-speed gas will blow away water droplets, dust and other foreign matter on the lens or in front of the lens, thus ensuring a clean and clear area in front of the lens, improving the clarity of the picture, solving the technical problem of unclear picture caused by the use of cameras or camcorders in extreme environments in the prior art.

4. BRIEF DESCRIPTION OF ACCOMPANY DRAWINGS

To make the technical solutions provided by the invention more comprehensible, a further description of the invention is given below in combination with the attached drawings and embodiments, and the embodiments are exemplary and not the limitations of the scope of the disclosure. Apparently, the described drawings are merely some embodiments of the application rather than all the embodiments of the application. It should be understood that the application is not limited to the drawings described herein. Based on the drawings in the invention, all other drawings obtained by those of ordinary skill in the art without making creative labor fall within the scope of protection of the invention.

Figure 1:
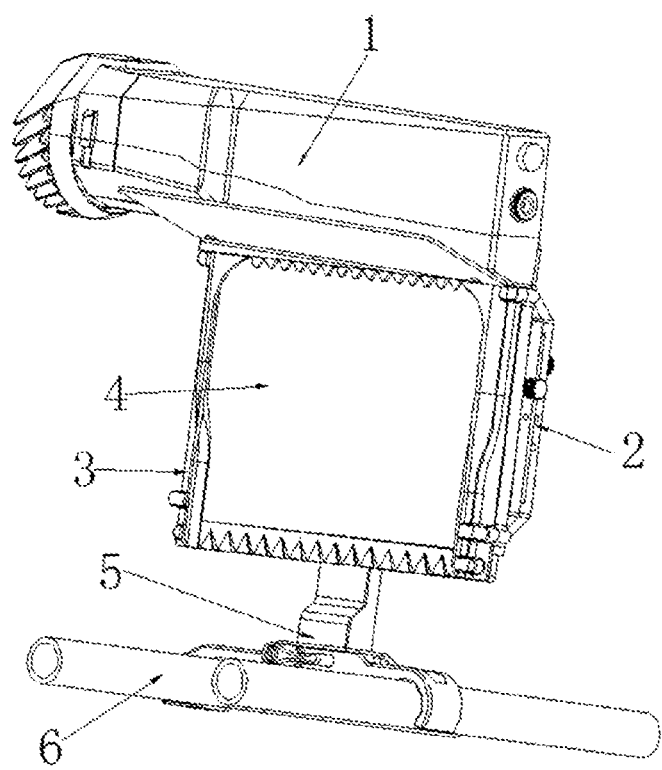
FIG. 1 is a schematic diagram showing the structure of the air-blowing type lens protection device provided by embodiments of the invention.
Figure 2:
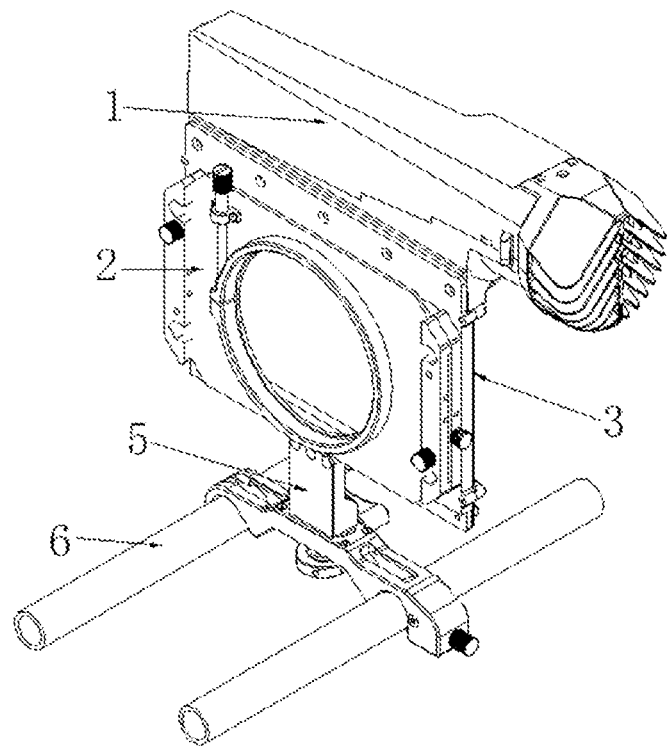
FIG. 2 is a schematic diagram showing the other side of the structure of the air-blowing type lens protection device provided by embodiments of the invention.
Figure 3:
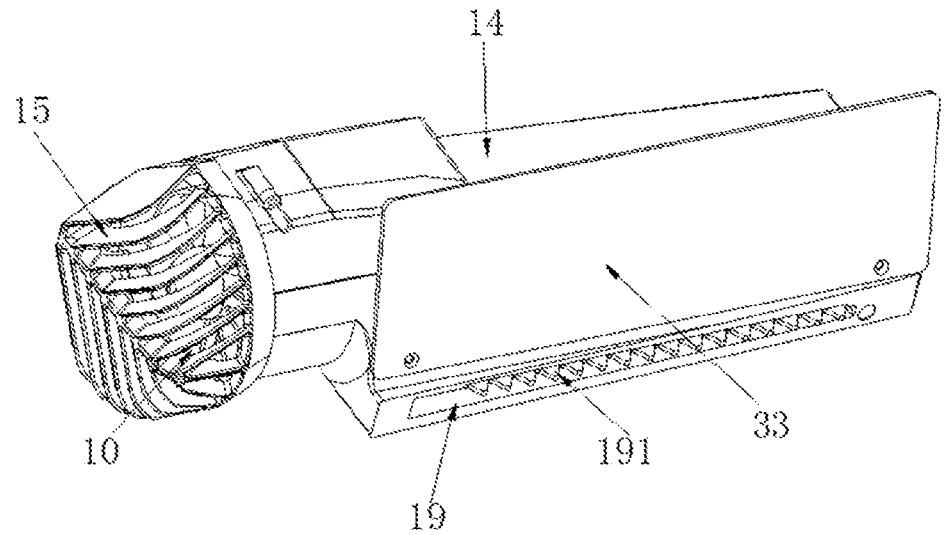
FIG. 3 is a schematic diagram showing the connection structure of the blowing assembly and the rain deflector of the air-blowing type lens protection device provided by embodiments of the invention.
Figure 4:
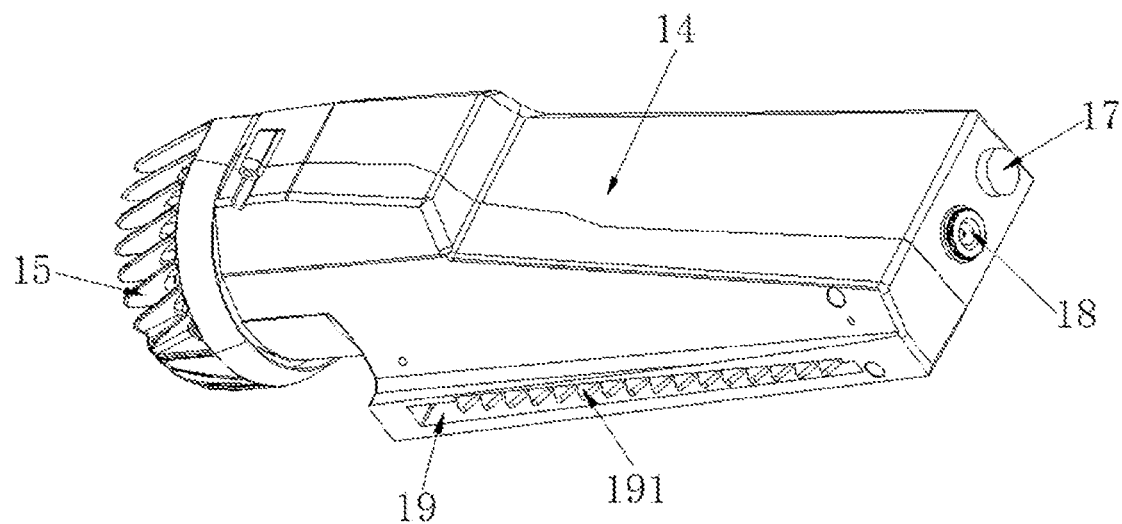
FIG. 4 is a schematic diagram showing the structure of the blowing assembly of the air-blowing type lens protection device provided by embodiments of the invention.
Figure 5:
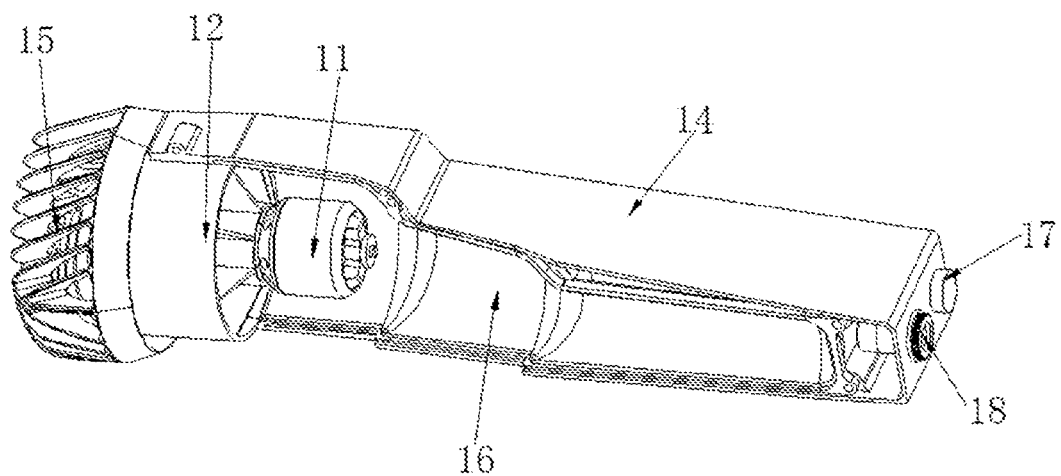
FIG. 5 is a schematic diagram showing the internal structure of the blowing assembly of the air-blowing type lens protection device provided by embodiments of the invention.
Figure 6:
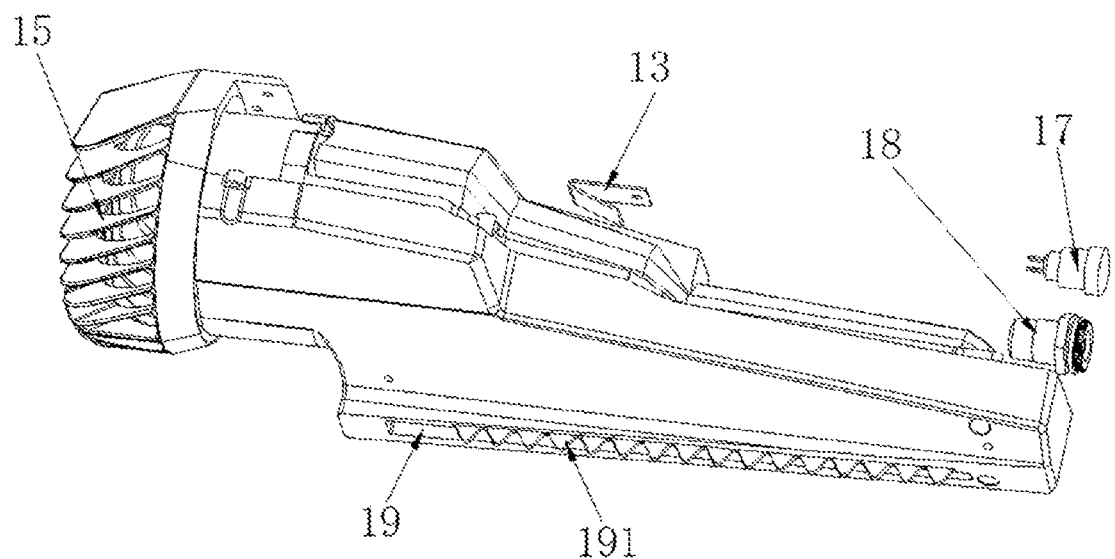
FIG. 6 is a schematic diagram showing another internal structure of the blowing assembly of the air-blowing type lens protection device provided by embodiments of the invention.
Figure 7:
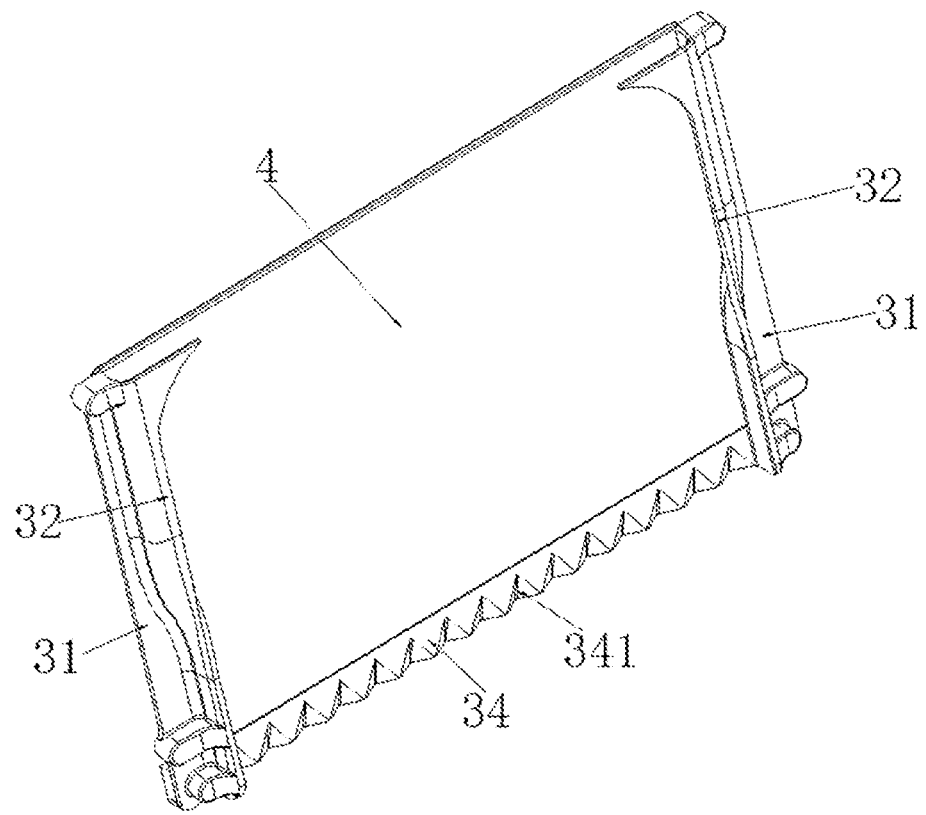
FIG. 7 is a schematic diagram showing the structure of the wind deflector bracket of the air-blowing type lens protection device provided by embodiments of the invention.
Figure 8:
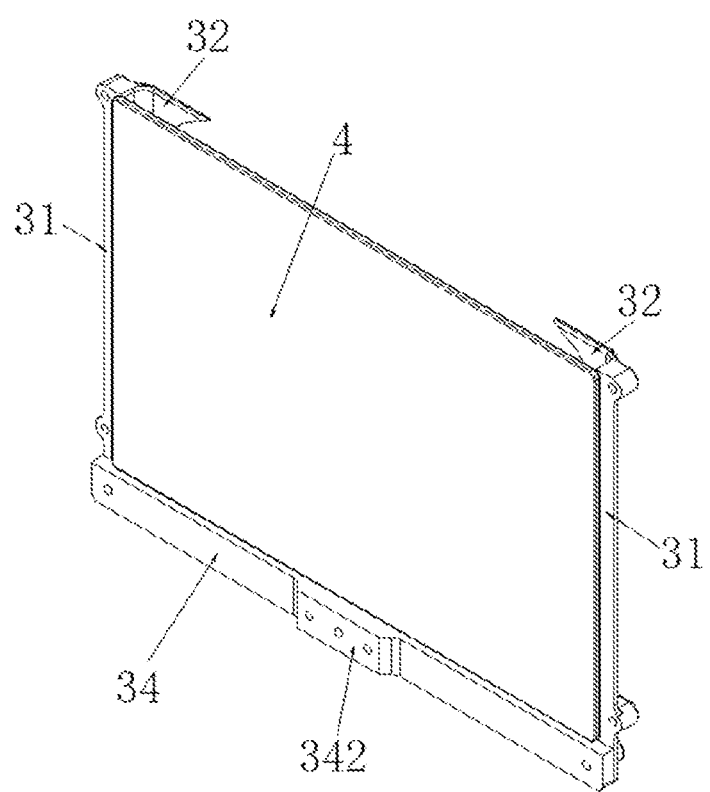
FIG. 8 is a schematic diagram showing the structure of another side of the wind deflector bracket of the air-blowing type lens protection device provided by embodiments of the invention.
Figure 9:
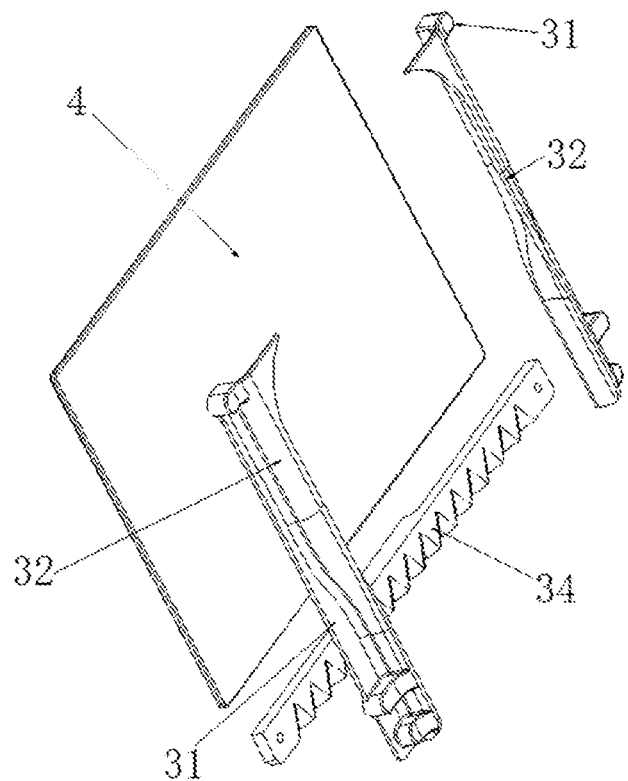
FIG. 9 is a schematic diagram showing an exploded view of the wind deflector bracket of the air-blowing type lens protection device provided by embodiments of the invention.
Figure 10:
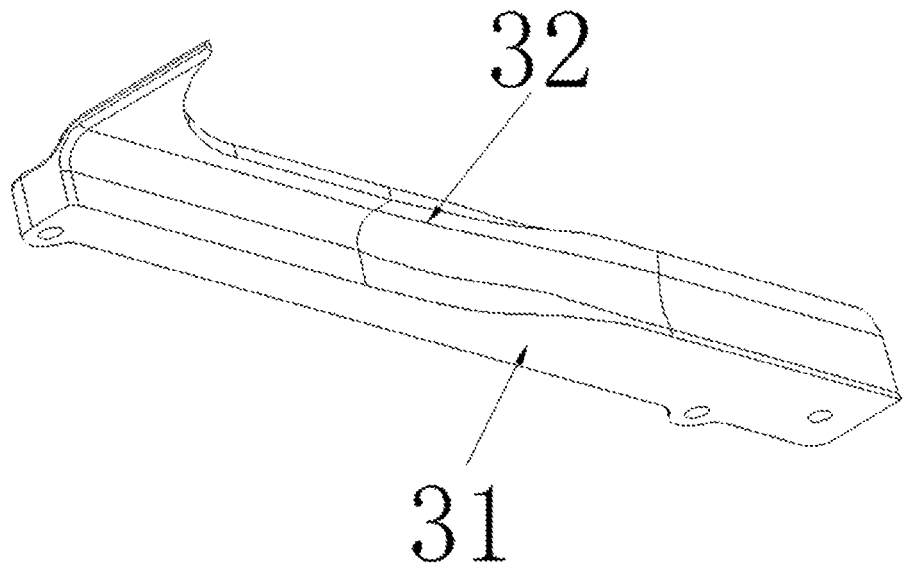
FIG. 10 is a schematic diagram showing the structure of the connection of the connecting side plate and the wind deflector of the air-blowing type lens protection device provided by embodiments of the invention.
Figure 11:
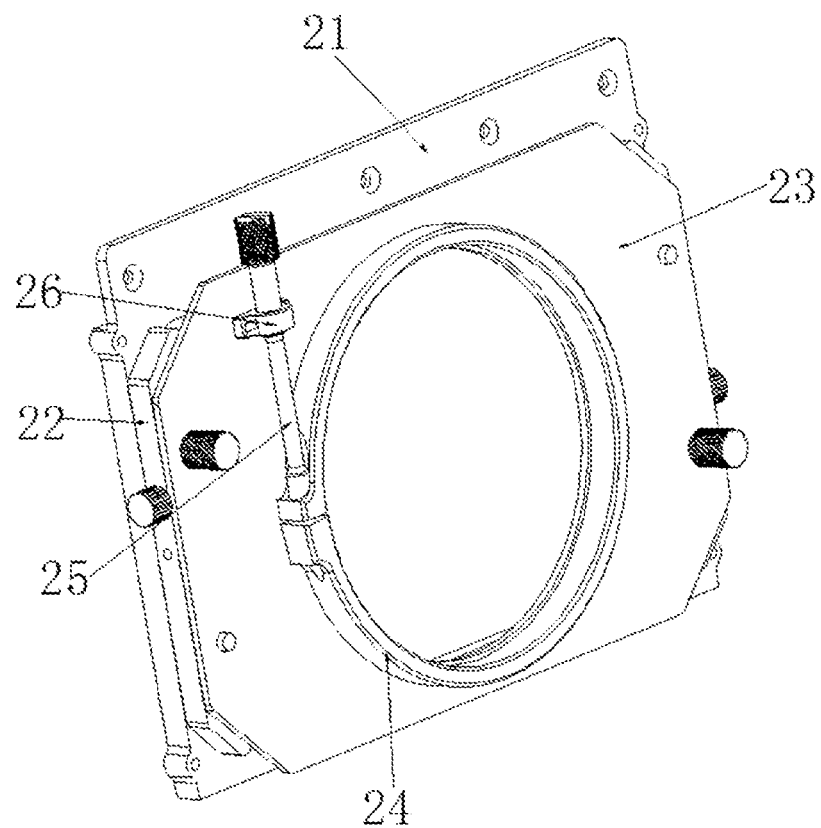
FIG. 11 is a schematic diagram showing the structure of the lens mount of the air-blowing type lens protection device provided by embodiments of the invention.
Figure 12:
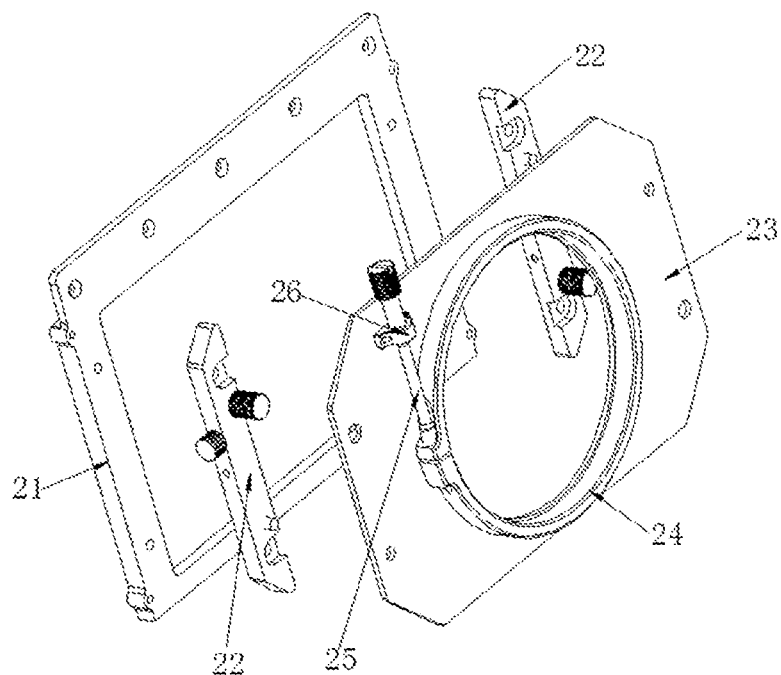
FIG. 12 is a schematic diagram showing an exploded view of the lens mount of the air-blowing type lens protection device provided by embodiments of the invention.
Figure 13:
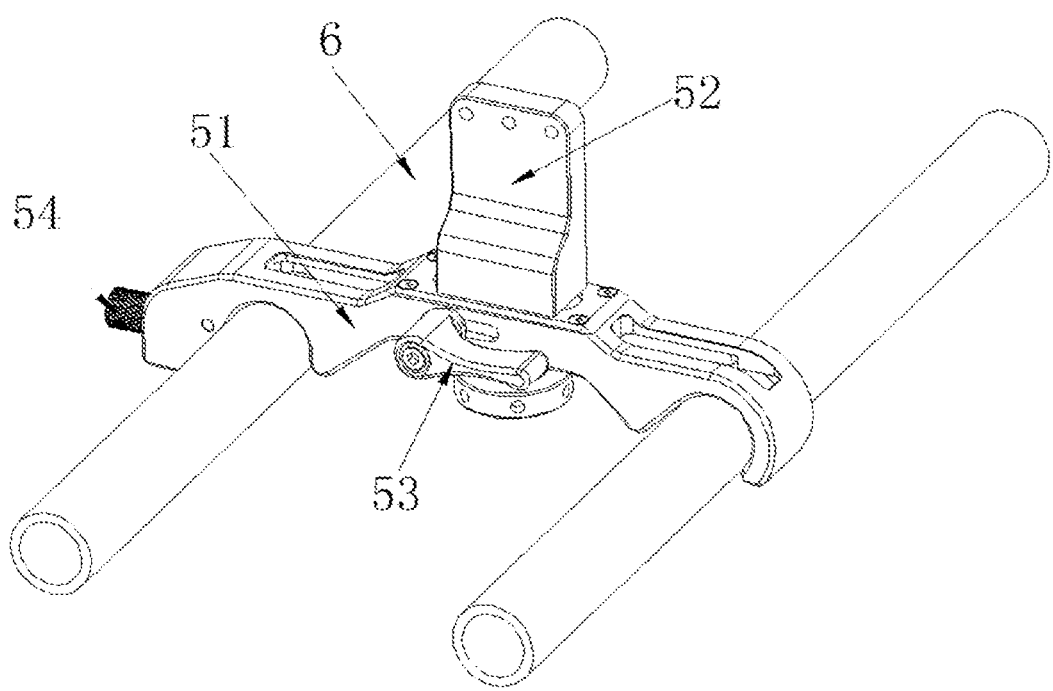
FIG. 13 is a schematic diagram showing the structure of the connecting bracket of the air-blowing type lens protection device provided by embodiments of the invention.
Figure 14:
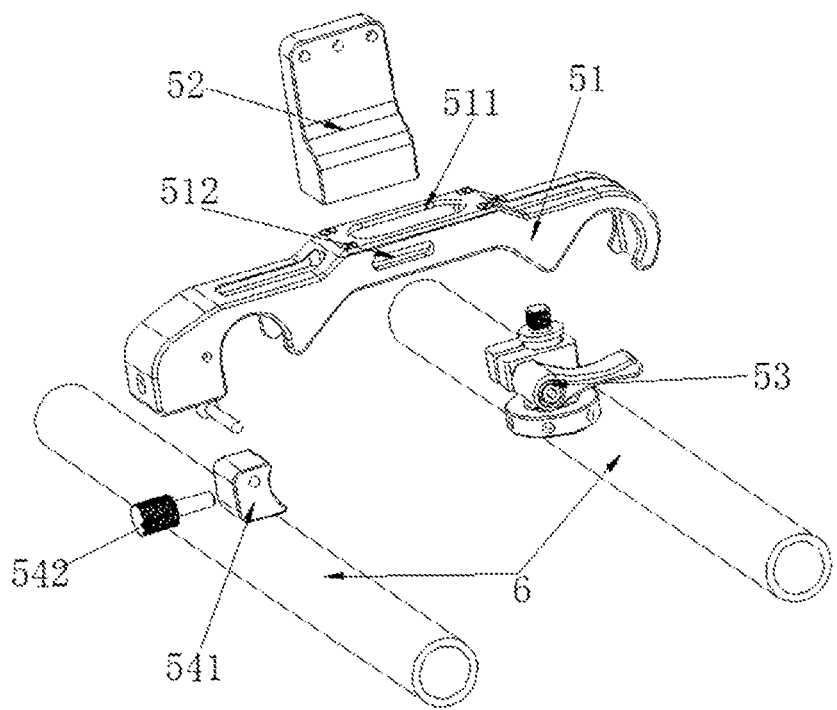
FIG. 14 is a schematic diagram showing an exploded view of the connecting bracket of the air-blowing type lens protection device provided by embodiments of the invention.
Figure 15:
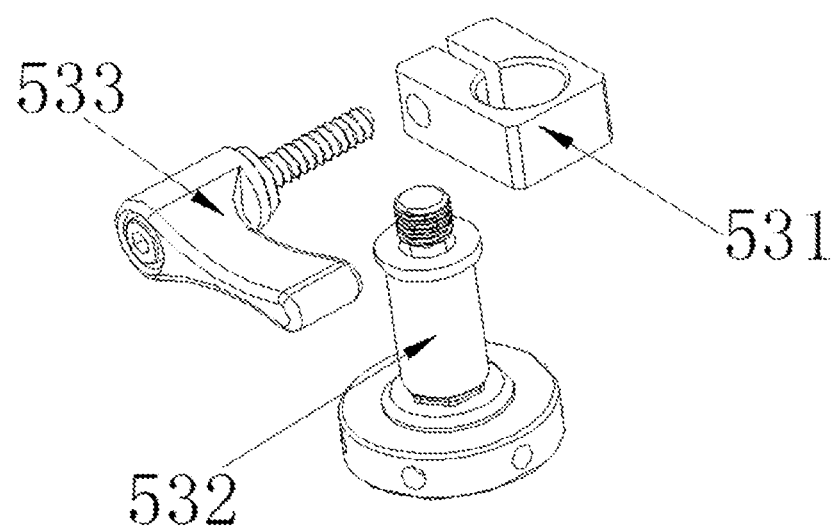
FIG. 15 is a schematic diagram showing an exploded view of the adjustment mechanism of the air-blowing type lens protection device provided by embodiments of the invention.

In the figures, 1. the blowing assembly; 11. the motor; 12. the blowing device; 13. the control element; 14. the housing; 15. the protective covers; 16. the conical duct; 17. the control button; 18. the power connector; 19. the air-blowing port; 191. the teeth; 10. the air inlets; 2. the lens mount; 21. the frame plate; 22. the thickening strips; 23. the connection plate; 24. the clamp; 25. the adjusting screw rod; 26. the supporting bracket; 3. the wind deflector bracket; 31. the connecting side plates; 32. the wind deflectors; 33. the rain deflector; 34. the diffuser plate; 341. the toothed recessed grooves; 342. the connecting piece; 4. the lens; 5. the connecting bracket; 51. the clamping bracket; 511. the moving cavity; 512. the sliding groove; 52. the third connecting piece; 53. the adjustment mechanism; 531. the sliding block; 532. the moving piece; 533. the adjustment piece; 54. the locking mechanism; 541. the abutting block; 542. the adjustment rod; 6. the guide rail columns.

5. SPECIFIC EMBODIMENT OF THE INVENTION

To make the technical solutions provided by the invention more comprehensible, exemplary embodiments according to the application are described below in detail with reference to the accompanying drawings. Apparently, the described embodiments are merely some embodiments of the application rather than all the embodiments of the application. It should be understood that the application is not limited to the exemplary embodiments described herein. The components of the embodiments of the invention generally described and illustrated in the accompanying drawings herein can be arranged and designed in a variety of different configurations.

In the description of the disclosure, it should be noted that unless otherwise specified, 'a plurality of' means two or more than two. Furthermore, orientation descriptions if mentioned, for example, orientations or positional relationships as indicated by terms such as 'top', 'bottom', 'left', 'right', 'inside', 'outside', 'front', 'back', 'head', 'end', are based on the orientations or positional relationships shown in the drawings, and they are intended for facilitating and simplifying description of the disclosure only, but not indicating or suggesting that the referred device or element must have such a specific orientation, or be constructed and operated in such a specific orientation, and thus, those orientations or positional relationships shall not be construed as limitations to the disclosure. In addition, terms such as 'first' and 'second' are used herein for purposes of description and are not intended to indicate or imply relative importance or significance or to imply the number of indicated technical features.

In the description of the disclosure, It should be noted that unless otherwise specified or defined, the terms such as 'mount', 'provide', 'arrange' 'connect', and 'assemble' should be understood in a broad sense, for example, the connection may be a fixed connection, a detachable connection, or an integral connection; or the connection may be a mechanical connection, or may be an electrical connection or communication with each other; or the connection may be a direct connection, an indirect connection through an intermediary, or internal communication between two components or mutual interaction relationship between two components. The specific meanings of the above terms in the disclosure may be understood according to specific circumstances for a person of ordinary skill in the art.

The invention provides an air-blowing type lens protection device, wherein comprises a blowing assembly 1, wherein the blowing assembly 1 is provided on the camera, and the air-blowing port 19 of the blowing assembly 1 is aimed at the lens on the camera. The invention provides an air-blowing type lens protection device, which is provided when using a camera or camcorder in an extreme environment by first mounting the blowing assembly 1 on the camera or camcorder. The air-blowing port 19 of the blowing assembly 1 will be aimed at the lens on the camera or camcorder at this time, and then the blowing assembly Twill be activated to produce high-speed gas. The high-speed gas will blow away water droplets, dust and other foreign matter on the lens or in front of the lens, thus ensuring a clean and clear area in front of the lens, improving the clarity of the picture, solving the technical problem of unclear picture caused by the use of cameras or camcorders in extreme environments in the prior art.

As the optional embodiment of the invention, the invention further comprises a lens mount 2, a wind deflector bracket 3 and a lens 4; the wind deflector bracket 3 and the blowing assembly 1 are provided on the same side of the lens mount 2, and the blowing assembly 1 is provided on top of the wind deflector bracket 3; the wind deflector bracket 3 and the blowing assembly 1 are connected to the lens mount 2; the middle of the lens mount 2 is connected to the lens in bayonet mount, the lens 4 is mounted in the wind deflector bracket 3, and the air-blowing port 19 of the blowing assembly 1 is aimed at the wind deflector bracket 3. When using a camera or camcorder in an extreme environment, to avoid damage from water or dust entering the inside of the camera or camcorder, the camera or camcorder can be placed in a waterproof bag with only the lens exposed for easy installation. The lens on the camera or camcorder is first mounted in lens mount 2, with lens 4 located in front of the lens, and lens 4 is intended to block foreign matters from falling into the lens. Then the blowing assembly 1 is activated to produce high-speed gas, and the high-speed gas will blow away the water droplets, dust and other foreign matter on lens 4 or in front of lens 4, thus ensuring a clean and clear area in front of the lens for improved picture clarity.

As the optional embodiment of the invention, the blowing assembly 1 comprises a motor 11, a blowing device 12, a control element 13 and a housing 14; the motor 11 and the control element 13 are provided in the housing 14, and the blowing device 12 is provided at the air inlets 10 of the housing 14; the motor 11 and the control element 13 are electrically connected, and the output shaft of the motor 11 is connected to the blowing device 12; the housing 14 is connected to the lens mount 2, the side wall of the housing 14 is provided with the air-blowing port 19. The blowing device 12 can be a compressor with brushless duct or a centrifugal compressor, or a piston compressor.

As the optional embodiment of the invention, the blowing assembly 1 further comprises protective covers 15 and a conical duct 16, and the protective covers 15 are connected to the outer wall of the air inlets 10 of the housing 14. The protective covers 15 prevent outside foreign matters from entering the housing 14 through the air inlets 10. The conical duct 16 is provided in the housing 14, and the blowing device 12 and the control element 13 are provided on each side of the conical duct 16. The conical duct 16 is designed to allow the gas produced by the blowing device 12 to form a high pressure and high-speed. After motor 11 is started, the outside gas can enter housing 14 through air inlets 10 by the action of the blowing device 12, forming a high-speed gas and ejecting it from the air-blowing port 19.

The protective covers 15 are provided with a plurality of baffles, and baffles are designed to prevent relatively large foreign matters from entering the housing 14 through the air inlets 10, thus creating a fully enclosed structure. The air-blowing ports 19 are provided with a plurality of teeth 191. The teeth 191 allow the high-speed gas to be ejected farther.

As the optional embodiment of the invention, the housing 14 is provided with a control button 17 and a power connector 18, and both the control button 17 and the power connector 18 are electrically connected to the control element 13. The power connector 18 is electrically connected to the power supply on the camera or camcorder, and the control button 17 is manually adjusted to control the speed of the motor 11, and enable it to be switched on and off. If the motor 11 is an AC brushless motor, an additional electronic speed regulator is required to convert the DC power of the camera or camcorder to AC power, providing power to the AC brushless motor.

As the optional embodiment of the invention, the wind deflector bracket 3 comprises connecting side plates 31, wind deflectors 32, a rain deflector 33 and a diffuser plate 34; there are two connecting side plates 31 and two wind deflectors 32; the lens mount 2 is connected to the connecting side plate 31, and the lens mount 2 and the connecting side plate 31 are clamped to the lens 4; the connecting side plates 31 and the wind deflectors 32 are fixedly connected, the rain deflector 33 is connected to the blowing assembly 1, and each end of the diffuser plate 34 is connected to the ends of two the connecting side plates 31. The rain deflector 33 is connected to the housing 14 by bolts, and there is a spacing between the rain deflector 33 and the lens 4. The high-speed gas generated by blowing assembly 1 will be blown out of the blowing port 19, and then the high-speed gas will be blown along lens 4 from top to bottom, thus blowing away any foreign matter falling on the lens 4. The function of the wind deflectors 32 is to block the flow direction of the high-speed gas, allowing the high-speed gas to be concentrated between the two wind deflectors 32. The wind deflectors 32 are provided in a concave curved structure.

As the optional embodiment of the invention, the rain deflector 33 is provided in an inclined position. The rain deflector 33 is provided above the air-blowing port 19, and the rain deflector 33 provides protection from the rain.

As the optional embodiment of the invention, a plurality of toothed recessed grooves 341 are provided on one end face of the diffuser plate 34. The high-speed gas with water droplets passing over the lens 4 will hit the toothed recessed grooves 341, thus breaking up the water droplets and forming a water mist, which in turn can prevent water droplets from remaining on the camera or camcorder. The connection piece 342 is provided on the other end face of the diffuser plate 34, and the connecting piece 342 is bolted to the third connecting piece 52.

As the optional embodiment of the invention, the lens mount 2 comprises a frame plate 21, thickening strips 22, connecting plate 23, clamp 24, adjusting screw rod 25 and supporting bracket 26. The upper end of the frame plate 21 is connected to the blowing assembly 1, where the upper end of the frame plate 21 is screwed to the housing 14. The side end of the wind deflector bracket 3, the side end of the frame plate 21, the thickening strips 22 and the connecting plate 23 are connected in sequence, where the connecting side plate 31 is connected to the side end of the frame plate 21. The number of the thickening strips 22 is two, and there is a space between the frame plate 21 and the connecting plate 23, with the space provided for placing filters. The left and right sides of the filter are restrained by the thickening strips 22, and the bottom of the filter is restrained by the connecting piece 342, and the thickening strips 22 are provided with fastening bolts to allow fastening of the filters.

The connecting plate 23 is provided with a penetration opening in the middle, and the clamp 24 is connected to the end of the penetration opening; the supporting bracket 26 is connected to the connecting plate 23, and the supporting bracket 26 is provided to support the adjusting screw rod 25. The adjusting screw rod 25 passes through the supporting bracket 26 and is connected to the two free ends of the clamp 24, and the lens is clamped to the clamp 24. There are multiple sizes of penetration openings and clamps 24, and the corresponding size of clamps 24 can be selected according to the size of the lens. By rotating the adjusting screw 25 with external force, the two free ends of clamp 24 can be made closer or farther away from each other, and when the two free ends of clamp 24 are closer to each other, the clamp 24 will fasten the lens. When the two free ends of the clamp 24 are moving away from each other, the lens can be removed from the clamp 24.

As the optional embodiment of the invention, the invention further comprises a connection bracket 5.

The connecting bracket 5 is provided in bolted connection with the wind deflector bracket 3, and the connecting bracket 5 is capable of clamping connection with the support frame on the camera; the connecting bracket 5 comprises a clamping bracket 51, a third connecting piece 52, an adjusting mechanism 53 and a locking mechanism 54; the clamping bracket 51 is provided with hook type structure at both ends, and the end of the clamping bracket 51 can be connected to the guide rail column 6 on the support frame; the end of the clamping bracket 51 is rotatably connected to the locking mechanism 54 and the locking mechanism 54 can fasten to the guide rail column 6; the third connecting piece 52 is bolted to the wind deflector bracket 3, where the third connection piece 52 is bolted to the connection piece 342; the end of the adjusting mechanism 53 is connected to the third connecting piece 52 and the adjusting mechanism 53 is movably connected to the middle of the clamping bracket 51. The locking mechanism 54 comprises an abutting block 541 and an adjustment rod 542. The abutting block 541 is provided in the end of the clamping bracket 51 and the abutting block 541 is rotatably connected to the end of the clamping bracket 51, and the adjustment rod 542 is connected to the abutting block 541 through the end of the clamping bracket 51. The end of the abutting block 541 is provided with a curved surface, and the adjustment rod 542 is adjusted by external force so that the adjustment rod 542 can push the abutting block 541 to rotate, resulting in the curved surface of the abutting block 541 against the side wall of the guide rail column 6, to limit the movement of the guide rail column 6 by the joint action of the abutting block 541 and the end of the clamping bracket 51.

The adjustment mechanism 53 comprises a sliding block 531, a moving piece 532 and an adjustment piece 533. The sliding block 531 is provided with a moving cavity 511 and a sliding groove 512 in the middle of the clamping bracket 51, and the sliding block 531 is provided in the moving cavity 511, and the sliding block 531 can move along the length of the moving cavity 511. One end of the moving piece 532 passes through the sliding block 531 and the moving cavity 511 and is connected to the third connecting piece 52, the moving piece 532 can move relative to the sliding block 531, and one end of the adjustment piece 533 passes through the sliding groove 512 and is connected to the sliding block 531. The sliding block 531 is provided with an open structure, and the adjustment piece 533 can allow the opening structure to be enlarged or reduced for limiting the moving piece 532, and the adjustment mechanism 53 can provide fine adjustment of the third connecting piece 52.

The invention and the embodiments thereof are described hereinabove, and this description is not restrictive. The foregoing descriptions are merely specific implementation manners of the disclosure, but are not intended to limit the protection scope of the disclosure. Any variation or replacement readily figured out by a person skilled in the art within the technical scope disclosed in the invention shall fall within the protection scope of the disclosure. Therefore, it is intended that the scope of the invention be defined by the protection scope of the claims.

The invention claimed is:

1. An air-blowing type lens protection device, comprising:
  a blowing assembly provided on a camera, and comprising an air-blowing port aimed at a lens on the camera;
  a lens mount; and
  a wind deflector bracket,
  wherein the wind deflector bracket and the blowing assembly are provided on the same side of the lens mount, and the blowing assembly is provided on top of the wind deflector bracket,
  wherein the wind deflector bracket and the blowing assembly are connected to the lens mount, and
  wherein the middle of the lens mount is connected to the lens in bayonet mount, the lens is mounted in the wind deflector bracket, and the air-blowing port of the blowing assembly is aimed at the wind deflector bracket.

2. An air-blowing type lens protection device according to claim 1, wherein the blowing assembly comprises a motor, a blowing device, a control element and a housing; the motor and the control element are provided in the housing, and the blowing device is provided at the air inlets of the housing; the motor and the control element are electrically connected, and the output shaft of the motor is connected to the blowing device; the housing is connected to the lens mount, the side wall of the housing is provided with the air-blowing port.

3. An air-blowing type lens protection device according to claim 2, wherein the blowing assembly further comprises protective covers and a conical duct; the protective covers are connected to the outer wall of the air inlets of the housing, and the conical duct is provided in the housing; the blowing device and the control element are provided on each side of the conical duct; the protective covers are provided with a plurality of baffles; the air-blowing ports are provided with a plurality of teeth.

4. An air-blowing type lens protection device according to claim 2, wherein the housing is provided with a control button and a power connector, and both the control button and the power connector are electrically connected to the control element.

5. An air-blowing type lens protection device according to claim 1, wherein the wind deflector bracket comprises connecting side plates, wind deflectors, a rain deflector and a diffuser plate; there are two connecting side plates and two wind deflectors; the lens mount is connected to the connecting side plate, and the lens mount and the connecting side plate are clamped to the lens; the connecting side plates and the wind deflectors are fixedly connected, the rain deflector is connected to the blowing assembly, and each end of the diffuser plate is connected to the ends of two the connecting side plates.

6. An air-blowing type lens protection device according to claim 5, wherein the rain deflector is provided in an inclined position.

7. An air-blowing type lens protection device according to claim 5, wherein a plurality of toothed recessed grooves are provided on one end face of the diffuser plate, and a connection piece is provided on the other end face of the diffuser plate.

8. An air-blowing type lens protection device according to claim 1, wherein the lens mount comprises a frame plate, thickening strips, connecting plate, clamp, adjusting screw rod and supporting bracket; the upper end of the frame plate is connected to the blowing assembly, and the side end of the wind deflector bracket, the side end of the frame plate, the thickening strips and the connecting plate are connected in sequence; the number of the thickening strips is two, and there is a space between the frame plate and the connecting plate, with the space provided for placing filters; the connecting plate is provided with a penetration opening in the middle, and the clamp is connected to the end of the penetration opening; the supporting bracket is connected to the connecting plate, the adjusting screw rod passes through the supporting bracket and is connected to the two free ends of the clamp, and the lens is clamped to the clamp.

9. An air-blowing type lens protection device, comprising:
a blowing assembly provided on a camera, and comprising an air-blowing port aimed at a lens on the camera; and
a connection bracket provided in bolted connection with the wind deflector bracket, and the connecting bracket is capable of clamping connection with the support frame on the camera; the connecting bracket comprises a clamping bracket, a third connecting piece, an adjusting mechanism and a locking mechanism; the clamping bracket is provided with hook type structure at both ends, and the end of the clamping bracket can be connected to the guide rail column on the support frame; the end of the clamping bracket is rotatably connected to the locking mechanism and the locking mechanism can fasten to the guide rail column; the third connecting piece is bolted to the wind deflector bracket, the end of the adjusting mechanism is connected to the third connecting piece and the adjusting mechanism is movably connected to the middle of the clamping bracket.

\* \* \* \* \*